Feb. 4, 1930.  H. BANY  1,746,182
AUTOMATIC CONTROL EQUIPMENT
Original Filed Aug. 29, 1927
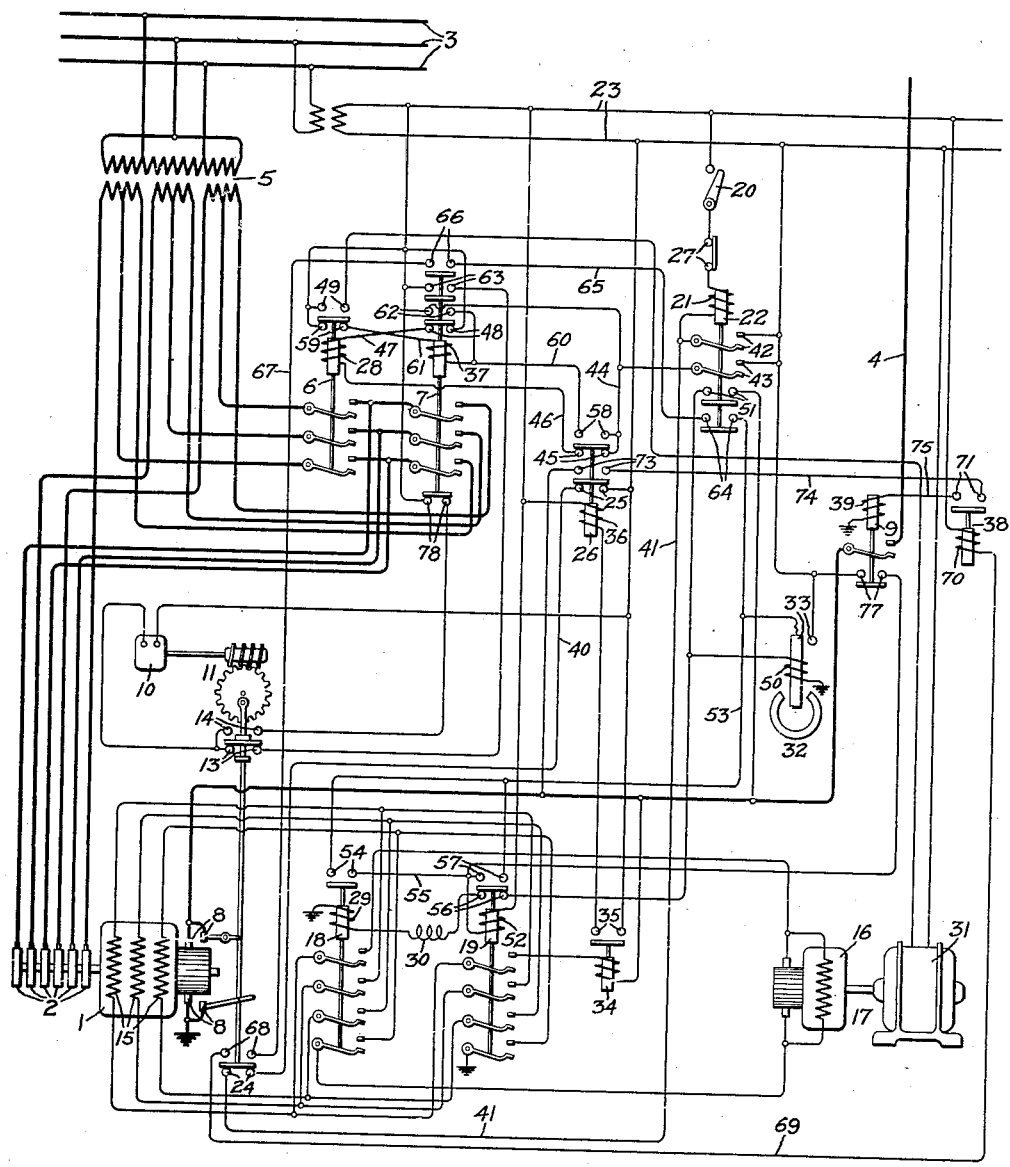
Inventor:
Herman Bany,
by [signature]
His Attorney.

Patented Feb. 4, 1930

1,746,182

UNITED STATES PATENT OFFICE

HERMAN BANY, OF SCOTIA, NEW YORK, ASSIGNOR TO GENERAL ELECTRIC COMPANY, A CORPORATION OF NEW YORK

AUTOMATIC CONTROL EQUIPMENT

Application filed August 29, 1927, Serial No. 216,048. Renewed November 20, 1929.

My invention relates to automatic control equipments for dynamo-electric machines and particularly to such equipments for synchronous converters.

An object of my invention is to provide a simple and improved control equipment of the above type in which a plurality of electromagnetically actuated devices are interconnected so that they operate automatically in the proper sequence to control the operation of a synchronous converter.

My invention will be better understood from the following description taken in connection with the accompanying drawing, and its scope will be pointed out in the appended claims.

Referring to the drawing, which shows one embodiment of my invention, 1 is a synchronous converter, the collector rings 2 of which are arranged to be connected to a suitable source of alternating current such as an alternating current supply circuit 3. The converter is arranged to supply direct current to a direct current distribution circuit 4, one side of which is shown as ground. It is to be understood, however, that my invention is not limited to a grounded distribution system. A transformer 5 is interposed between the supply circuit 3 and the collector rings 2 of the converter and is provided with suitable taps on its secondary winding so that a relatively low voltage may be impressed upon the collector rings while the converter is being started and normal operating voltage may be impressed upon the collector rings after the converter has been started. Any suitable switching means may be provided for controlling the connections between the transformer and the collector rings. As shown in the drawing, a contactor 6 is provided for connecting the low voltage taps of the transformer to the collector rings and a contactor 7 is provided for connecting the high voltage taps of the transformer to the collector rings.

The direct current brushes 8 of the converter are arranged to be connected to the direct current distribution circuit 4 by a contactor 9 which is arranged to connect the ungrounded brushes of the converter to the ungrounded side of the distribution circuit. Any other suitable means, however, may be used for controlling the connection between the converter and the distribution circuit.

The converter 1 is provided with any suitable means for raising the direct current brushes from the commutator so as to prevent sparking during the starting operation. In the particular arrangement diagrammatically shown in the drawing all but two of the brushes are pivotally mounted so that they can be raised and lowered by means of a motor 10 operating through a worm and worm gear 11, and a crank operated by the worm gear. The movable and stationary brushes of corresponding polarity are electrically connected together. When the worm and worm gear 11 are in the position shown the movable brushes are raised. When the worm gear has been rotated 180° from the position shown the movable brushes are in engagement with the commutator. Suitable limit switches 13 and 14, are provided so that the circuit of the motor 10 is automatically operated when the brush raising and lowering operations have been completed. As shown the switch 13 is closed when the brush raising operation is completed and remains closed until the brush lowering operation is completed. The switch 14 is closed when the lowering operation is completed and remains closed until the brush raising operation is completed.

The synchronous converter is provided with a field winding 15 which is arranged to be connected to a suitable source of direct current such as a generator 16 of motor generator set 17 by suitable switching means 18. The field winding 15 is also arranged to be connected across the direct current brushes of the converter by means of another suitable switching device 19. Preferably the field winding 15 is arranged to be divided into several sections when both of the switching means 18 and 19 are open so that when the converter is being started the voltage stresses in the field winding are reduced to a safe value.

In order to start and stop the synchronous converter under normal conditions a hand switch 20 is provided which, when closed, initiates the starting of the converter and which, when opened, initiates the stopping of the converter. It is to be understood, however, that any other well known means, which may be either automatically or manually actuated, may be used to initiate the starting and stopping of the converter. As shown in the drawing, the closing of the switch 20 connects the coil 21 of a control relay 22 across a suitable control circuit 23 which may be supplied from a suitable source of current such as the supply circuit 3.

Since it is desirable to start the converter only when the movable brushes 8 are out of engagement with the commutator of the converter, the energizing circuit of the coil 21 of the relay 22 also includes contacts 24 on the brush raising mechanism which are closed only when the movable brushes are out of engagement with the commutator. The circuit of the coil 21 also includes the contacts 25 of a relay 26, which is connected so that it is energized when the converter is self-excited. The circuit of coil 21 also includes contacts of the protective devices, which are usually provided with automatic control equipments, so that the relay 22 can operate to effect the starting of the synchronous converter only when these protective devices indicate that the apparatus is in an operative condition. In order to simplify the disclosure these protective devices have been omitted since they do not constitute a part of my present invention. Contacts 27, however, are shown to indicate where the contacts of these protective devices may be connected in the circuit of the coil 21.

When the relay 22 is energized by the closing of the control switch 20 it effects the completion of a circuit for the coil 28 of the starting contactor 6 so that the collector rings 2 are connected to the low voltage taps of the transformer 5 to start the converter.

In order that the converter may be pulled into synchronism with the correct polarity in case it builds up in the wrong direction while the converter is accelerating, the switching means 18 is arranged to connect the field winding 15 of the converter to the source of excitation 16 when the converter reaches substantially synchronous speed. This result is accomplished by connecting the closing coil 29 of the switching means 18 across the direct current brushes 8 of the converter with a suitable reactor 30 in series therewith during the starting operation so that sufficient current does not flow through the coil 29 to close the switch 18 until the converter reaches substantially synchronous speed and very low frequency current flows through the circuit of the coil 29. In order that the voltage of the generator 16 may have time to build up to its normal value before switch 18 closes, the starting switch 6 is arranged to complete a circuit for the motor 31 of the motor generator set 17 to start the set at the same time that the converter is connected to the low voltage taps on the transformer.

In order to change from separate excitation to self-excitation of the converter after the converter has been pulled into synchronism with the correct polarity, I provide a polarized relay 32, the coil of which is arranged to be connected across the direct current brushes of the converter. This polarized relay is designed so that it closes its contacts 33 only when the direct current voltage across the direct current brushes of the converter is above a predetermined value and has a predetermined polarity. When the polarized relay 32 closes its contacts 33 it effects the closing of the switching means 19 so that the field winding 15 of the converter is connected across the direct current brushes of the converter. The closing of the switching means 19 is arranged to effect the opening of the switching means 18 so as to disconnect the field winding 15 from the generator 16.

In order to effect the opening of the starting breaker 6 and the closing of the running breaker 7 after the transfer from separate excitation to self-excitation has been effected, I provide a relay 34, the coil of which is arranged to be connected in series with the field winding 15 when it is connected across the direct current brushes of the converter. This relay 34 is preferably designed so that it operates only in response to a predetermined value of direct current. As soon as the direct current through the field winding 15 builds up to a predetermined value after the switch 19 is closed the relay 34 operates to close its contacts 35 to complete a circuit for the coil 36 of the auxiliary relay 26. The relay 26 when energized is arranged to effect the opening of the circuit of the coil 28 of the starting contactor 6 and the closing of contacts in the circuit of the closing coil 37 of the running contactor 7 so that the starting contactor 6 is opened and the running contactor 7 is closed. These contactors are electrically interlocked so that contactor 7 cannot be closed until after contactor 6 has opened.

As soon as the running breaker 7 is closed a circuit is completed for the operating motor 10 of the brush raising mechanism to lower the movable brushes 8 into engagement with converter commutator. After the brushes have been lowered a circuit is completed for a control relay 38 which in turn controls the circuit for the closing coil 39 of the switching means 9 so as to effect the connection of the direct current brushes of the converter to the direct current distribution circuit 4.

The operation of the equipment shown in the drawing is as follows: When the converter is shut down and all of the apparatus is in an operative condition the various control devices occupy the positions shown in the drawing. When the control switch 20 is closed to effect the starting of the converter a circuit is completed for the closing coil 21 of the control relay 22. This circuit is from one side of the control circuit 23 through contacts 25 of relay 26, conductor 40, contacts 24 on the brush raising mechanism, conductor 41, coil 21 of relay 22, contacts 27 of the protective devices, control switch 20 to the other side of the control circuit 23. Since, under the conditions assumed, the relay 26 is deenergized and the movable brushes 8 are raised, the control relay 22 is energized. By closing its contacts 42, relay 22 completes a locking circuit for itself which is independent of the contacts 24 of the brush raising mechanism and the contacts 25 of the relay 26 so that the relay 22 remains energized when these contacts are subsequently open during the starting operation. Relay 22 by closing its contacts 43 completes a circuit for the closing coil 28 of the starting contactor 6 so that the collector rings 2 of the converter are connected to the low voltage terminals of the transformer 5. The circuit of coil 28 is from one side of the control circuit 23 through the contacts 43 of the relay 22, conductor 44, contacts 45 of relay 26, conductor 46, coil 28 of contactor 6, conductor 47, contacts 48 of contactor 7 to the other side of the control circuit. As soon as contactor 6 closes the converter starts from rest. The contactor 6 by closing its contacts 49 connects the motor 31 of the motor generator set 17 across the control circuit 23 so that the generator 16 is in condition to supply direct current to the field winding 15 when the switch 18 is closed.

Relay 22 by closing its contacts 51 connects the coil 50 of the polarized relay 32 and the coil 29 of the switch 18 across the direct current brushes of the converter. As long as the converter is rotating at a speed below synchronous speed the current flowing through the circuit of the coil 29 of the switch 18 is an alternating current. The inductance of the reactor 30 which is connected in series with the coil 29 is of such a value that sufficient alternating current cannot flow through the circuit of the coil 29 to cause the switch 18 to close until the converter reaches substantially synchronous speed. When, however, the converter reaches synchronous speed sufficient current flows through the circuit of the coil 29 to close the switch 18 thereby connecting the field winding 15 across the generator 16 to pull the converter into synchronism with the right polarity. As soon as the converter pulls into synchronism with right polarity and the direct current voltage is above a predetermined value the polarized relay 32 closes its contacts 33 and completes a circuit for the closing coil 52 of the switch 19. The circuit of the closing coil 52 is from one side of the control circuit 23 through contacts 33 of the polarized relay 32, conductor 53, contacts 54 of switch 18, conductor 55, closing coil 52 of contactor 19 to the other side of the control circuit 23. Contactor 19 by closing its main contacts connects the field winding 15 of the converter across the direct current brushes of the converter with the coil of relay 34 in series therewith. Contactor 19 by opening its auxiliary contacts 56 opens the above traced circuit for the closing coil 29 of contactor 18 so that the field winding 15 is disconnected from the generator 16 after the contactor 19 is closed. Contactor 19 by closing its auxiliary contacts 57 completes a shunt circuit around contacts 54 of switch 18 so that the closing coil 52 remains energized after the switch 18 opens.

As soon as the direct current through the field winding builds up to a predetermined value after switch 19 closes, relay 34 closes its contacts 35 and completes a circuit for the coil 36 of relay 26 directly across the control circuit 23. The relay 26 by opening its contacts 45 opens the heretofore described circuit for the closing coil 28 of contactor 6 so that the contactor 6 opens and disconnects the converter from the low voltage taps on the transformer 5. The contactor 6 by opening its contacts 49 effects the shutting down of the motor generator set 17 since the converter is now self-excited and, therefore, there is no further need of the motor generator set. Relay 26 by closing its contacts 58 completes a circuit for the closing coil 37 of contactor 7 as soon as the starting contactor 6 opens and closes its auxiliary contacts 59. This circuit is from one side of the control circuit 23 through contacts 43 of the relay 22, conductor 44, contacts 58 of relay 26, conductor 60, closing coil 37 of running switch 7, conductor 61, contacts 59 on starting switch 6 to the other side of the control circuit. The closing of the running switch 7 connects the collector rings 2 to the normal operating terminals of the converter 5. Running switch 7 by closing its contacts 62 completes a shunt circuit around contacts 58 of relay 26 so as to prevent the closing coil 37 from being deenergized by the relay 26 momentarily opening its contacts 58 due to any inductive disturbance which may occur in the field circuit while the transfer is being made from starting to running connections.

Running switch 7 by closing its auxiliary contacts 63 completes the lowering circuit of the control motor 10 of the brush raising mechanism across the control circuit 23 so that the movable brushes 8 are moved into engagement with the commutator of the converter. When the brush lowering operation is completed the limit switch 13 opens and the limit switch 14 closes. The opening of the limit switch 13 opens the circuit of the motor 10.

As soon as the brush lowering operation has been completed a circuit is completed for the control relay 38 to effect the closing of the direct current circuit breaker 9. The circuit of the control relay 38 is from one side of the control circuit 23 through contacts 33 of polarized relay 32, contacts 64 of relay 22, conductor 65, contacts 66 of running switch 7, conductor 67, contacts 68 on the brush raising mechanism, conductor 69, coil 70 of relay 38 to the other side of the control circuit. Relay 38 by closing its contacts 71 may be arranged to effect the completion of the circuit of the closing coil circuit of the direct current switch 9 in any suitable manner. In the particular arrangement shown the closing of the contacts 71 completes a circuit for the coil 39 of circuit breaker 9 from the ungrounded terminal of the converter through contacts 73 of relay 26, conductor 74, contacts 71 of relay 38, conductor 75, closing coil 39 of circuit breaker 9 to the grounded terminal of the converter. The closing of circuit breaker 9 connects the direct current brushes of the converter to the load circuit. Circuit breaker 9 by closing its contacts 77 completes a shunt around contacts 54 of switch 18, contacts 57 of switch 19 and contacts 33 of relay 32 so that the coil 52 of contactor 19 is connected directly across the control circuit 23. Therefore, the shunt field circuit is not opened during the shutting down operation until after the converter is disconnected from the load circuit.

The converter shuts down whenever the control relay 22 is deenergized, either by opening the control switch 20, or by one of the protective devices opening its contacts 27. Relay 22 by opening its contacts 43 interrupts the circuit of the closing coil 37 of the running contactor 7 so that the converter is disconnected from the high voltage terminals of the transformer 5. As soon as the contactor 7 opens, a circuit is completed for the motor 10 of the brush raising mechanism through auxiliary contacts 78 on the running contactor 7. As soon as the brushes have been raised, the raising circuit for the motor 10 is interrupted by the opening of the contacts 14 on the brush raising mechanism.

Relay 22 by opening its contacts 51 disconnects the coil 29 and the polarized relay 32 from across the direct current brushes of the converter. Relay 22 by opening its contacts 64 interrupts the circuit of the coil 70 of relay 38. Relay 38 in turn opens the circuit of the closing coil 39 of circuit breaker 9 so that the converter is disconnected from the load circuit. As soon as the circuit breaker 9 opens its auxiliary contacts 77, switching means 19 opens to disconnect the field winding 15 from across the direct current brushes of the converter. After the switch 19 opens the relay 34 opens its contacts 35 in the circuit of relay 26.

It will be observed that after relay 22 has opened its contacts 42 it cannot be reenergized until the brushes have been raised so that the contacts 24 are closed and the relay 26 is deenergized, indicating that the shunt field circuit of the converter is open. Therefore, there is no possibility of restarting the converter until the control apparatus therefor is in a condition to effect the starting thereof in the proper sequence.

What I claim as new and desire to secure by Letters Patent of the United States, is:—

1. In combination, a synchronous converter, a source of excitation, switching means for connecting said source of excitation to said field winding, electro-responsive means arranged when energized to effect the connection of the converter field winding across the direct current brushes of the converter, a circuit for said electroresponsive means, contacts in said circuit actuated by said switching means and arranged to be closed when said switching means is in a position to connect said source to the field winding, a polarity responsive means connected across the direct current brushes of said converter, and other contacts in the circuit of said electroresponsive means controlled by said polarity responsive means.

2. In combination, a synchronous converter, a source of excitation, switching means for connecting said source of excitation to said field winding, electroresponsive means arranged when energized to effect the connection of the converter field winding across the direct current brushes of the converter, a circuit for said electroresponsive means, contacts in said circuit actuated by said switching means and arranged to be closed when said switching means is in a position to connect said source to the field winding, a polarity responsive means connected across the direct current brushes of said converter, other contacts in said circuit controlled by said polarity responsive means, and means responsive to the energization of said electroresponsive means for effecting the operation of said switching means to disconnect the field winding from said source of excitation and for effecting the completion of a circuit for said electroresponsive means which is independent of the contacts actuated by said switching means.

3. In combination, a synchronous converter, a source of excitation, switching means for connecting said source of excitation to said field winding, electroresponsive means arranged when energized to effect the connection of the converter field winding across the direct current brushes of the converter, a circuit for said electroresponsive means, contacts in said circuit actuated by said switching means and arranged to be closed when said switching means is in a position to connect said source to the field winding, a polarity responsive means connected across the direct current brushes of said converter, other contacts in said circuit controlled by said polarity responsive means, a load circuit, switching means for connecting said converter to said load circuit, and means controlled by said last mentioned switching means for completing a circuit for said electroresponsive means which is independent of said contacts when said converter is connected to the load circuit.

4. In combination, a synchronous converter, a source of excitation, an electroresponsive device for connecting said source to the field winding of said converter, a circuit for said electroresponsive device arranged to be connected across the direct current brushes of said converter, another electroresponsive device for connecting the field winding of said converter across the direct current brushes thereof, an energizing circuit for said other electroresponsive device, contacts in said energizing circuit arranged to be closed by said first mentioned electroresponsive device when energized, a polarized relay connected across the direct current brushes of said converter, other contacts in said energizing circuit arranged to be closed by said polarized relay when the direct current voltage of said converter is above a predetermined value and in a predetermined direction, means controlled by said other electroresponsive device for completing a shunt circuit around the contacts in the energizing circuit which are closed by the first mentioned electroresponsive device, and contacts in the circuit of said first mentioned electroresponsive device arranged to be opened by said other electroresponsive device when energized.

5. In combination, a synchronous converter, a source of excitation, an electroresponsive device for connecting said source to the field winding of said converter, a circuit for said electroresponsive device arranged to be connected across the direct current brushes of said converter, another electroresponsive device for connecting the field winding of said converter across the direct current brushes thereof, an energizing circuit for said other electroresponsive device, contacts in said energizing circuit arranged to be closed by said first mentioned electroresponsive device when energized, a polarized relay connected across the direct current brushes of said converter, other contacts in said energizing circuit arranged to be closed by said polarized relay when the direct current voltage of said converter is above a predetermined value and in a predetermined direction, means controlled by said other electroresponsive device for completing a shunt circuit around the contacts in its energizing circuit which are closed by the first mentioned electroresponsive device, contacts in the circuit of said first mentioned electroresponsive device arranged to be opened by said other electroresponsive device when energized, a load circuit, switching means for connecting said converter to said load circuit, and means controlled by said switching means for completing a shunt circuit around all of said contacts when the converter is connected to the load circuit.

In witness whereof, I have hereunto set my hand this 27th day of August, 1927.

HERMAN BANY.